E. G. FAVRE.
VEHICLE BRAKE.
APPLICATION FILED JAN. 18, 1912.
1,041,056.
Patented Oct. 15, 1912.
3 SHEETS—SHEET 1.
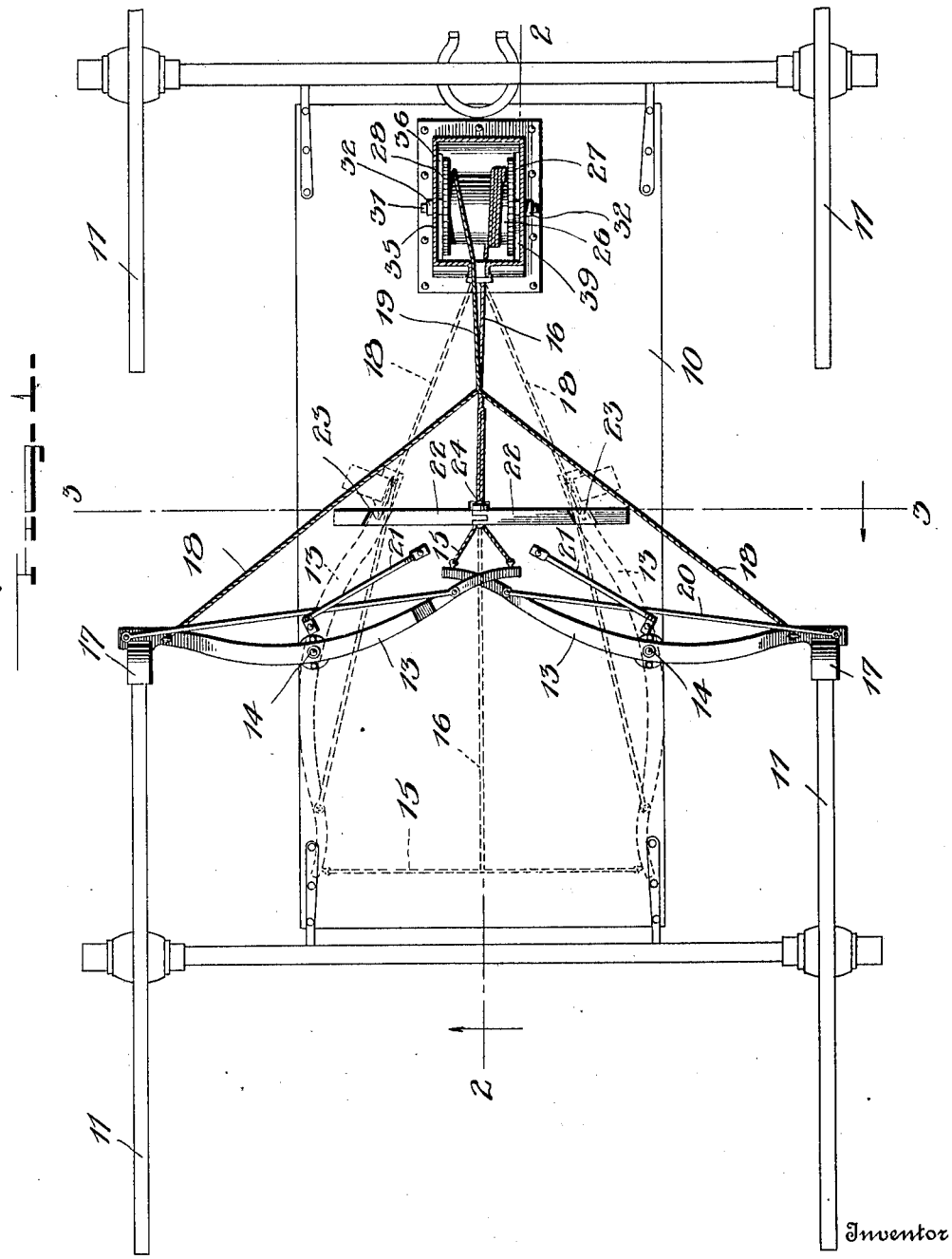
Witnesses
W. H. Rockwell
Francis Boyle
Inventor
E. G. Favre
By Chandler & Chandler
Attorneys

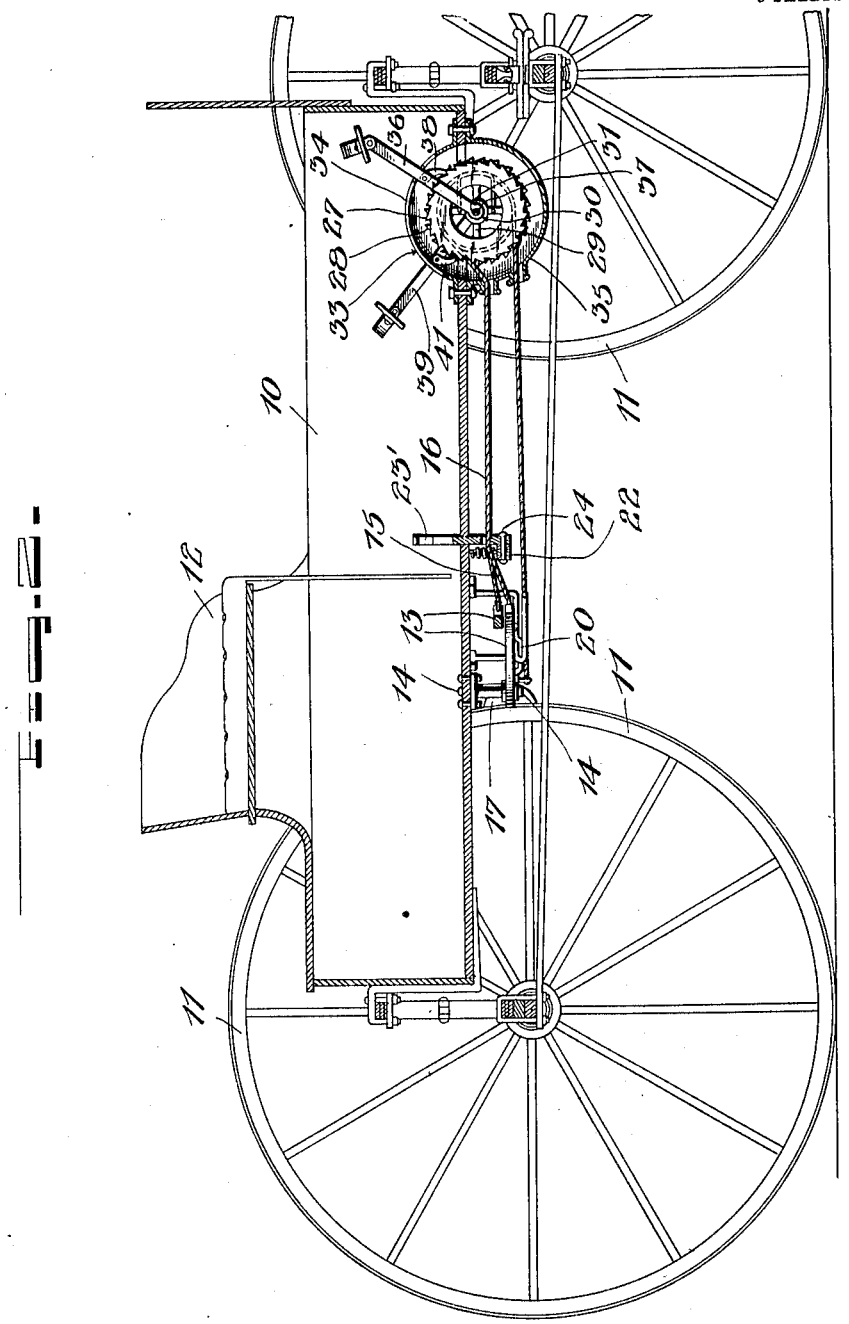

E. G. FAVRE.
VEHICLE BRAKE.
APPLICATION FILED JAN. 18, 1912.
1,041,056.
Patented Oct. 15, 1912.
3 SHEETS—SHEET 3.
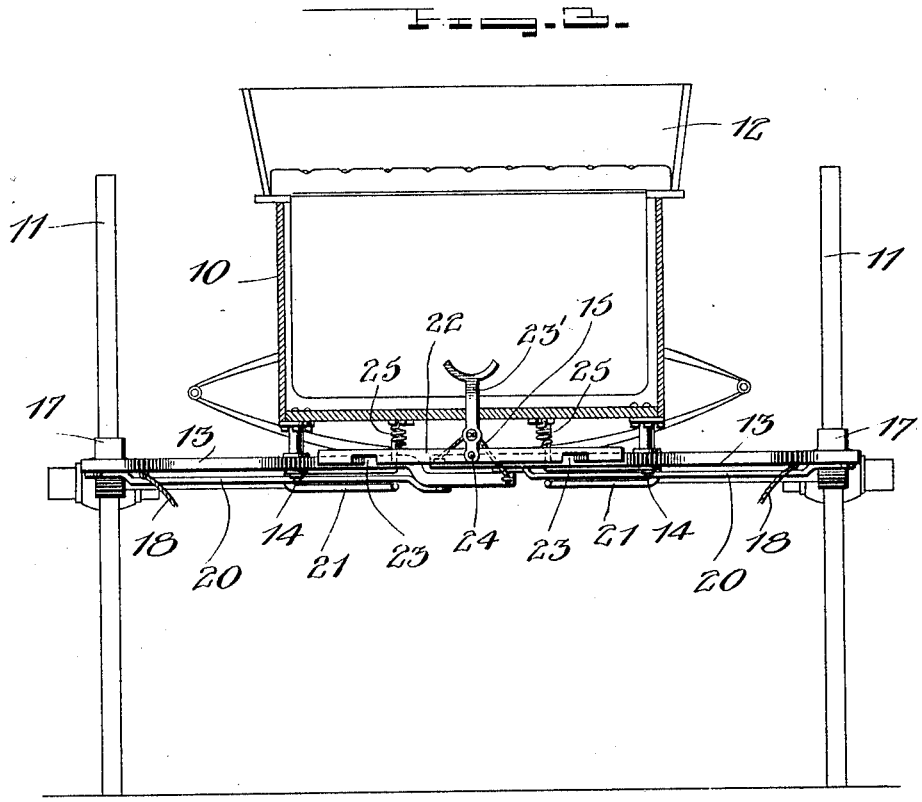
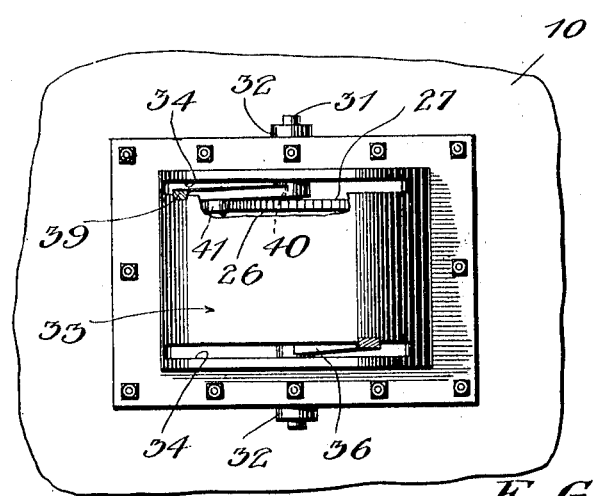
Witnesses
Inventor
E. G. Favre
By
Attorneys

UNITED STATES PATENT OFFICE.

EMILE G. FAVRE, OF EARLVILLE, ILLINOIS.

VEHICLE-BRAKE.

1,041,056.  Specification of Letters Patent.  Patented Oct. 15, 1912.

Application filed January 18, 1912. Serial No. 671,951.

*To all whom it may concern:*

Be it known that I, EMILE G. FAVRE, a citizen of the United States, residing at Earlville, in the county of Lasalle, State of Illinois, have invented certain new and useful Improvements in Vehicle-Brakes; and I do hereby declare the following to be a full, clear, and exact description of the invention, such as will enable others skilled in the art to which it appertains to make and use the same.

This invention relates to vehicle brakes and has for an object to provide a strong, durable brake that will be entirely concealed below the vehicle box when released and will furthermore have novel means for locking the parts in released position.

A second object of the invention is to provide novel means for moving the brake to operative and to released position, there being further means provided for guiding the brake arms in their sliding movements whereby injury to the parts is prevented.

With the above objects in view the invention consists of certain novel details of construction and combination of parts hereinafter fully described and claimed, it being understood that various modifications may be made in the minor details of construction within the scope of the appended claims.

In the accompanying drawings forming part of this specification:—Figure 1 is a bottom plan view of a vehicle equipped with my improved brake. Fig. 2 is a longitudinal sectional view through the box taken on the line 2—2 Fig. 1. Fig. 3 is a cross sectional view taken on the line 3—3 Fig. 1. Fig. 4 is a fragmentary plan view showing the ratchet means for actuating the brake with parts broken away.

Referring now to the drawings in which like characters of reference designate similar parts, 10 designates in general a vehicle box having supporting wheels 11, and carrying a seat 12.

The brake comprising the subject-matter of this invention consists of two bowed brake bars 13 pivotally connected to the wagon bottom through the instrumentality of pivot bolts 14, the opposite ends of each bar being bowed oppositely from the curvature of the body of the bar. Secured to the rear ends of the bars is a connecting cord 15 and to the center of this cord is connected a draw cable 16 which extends longitudinally along the wagon bottom and forms means for rocking the bars on their pivots until the forward ends 17, which performing the function of brake shoes, engage with the rims of the rear wheels. A connecting cord 18 connects the forward ends of the bars, and to the center of this cord is attached a draw cable 19 which extends longitudinally and forwardly upon the wagon bottom and forms means for rocking the brake bars on their pivots into released position within the border of the wagon bottom as shown in dotted lines in Fig. 1. Each brake bar is strengthened by a longitudinal brace 20 which spans the body of the bar and is terminally secured near the ends of the bar. An open loop guide rod 21 is secured to the wagon bottom and the brace bears within this loop throughout all of its sliding movements and is guided thereby, the guide bar thus relieving the pivot of the brake bar of considerable strain.

For locking the brake bars in released position, I provide a pair of rods 22 which are formed near the outer ends with notches 23 to receive the brake bars near the brake shoes, a stand rod 23′ being engaged through the wagon bottom, and overlapping the inner ends of the rods 22, a single pivot pin 24 being passed through the parts to pivotally secure all of these rods together. Helical springs 25 are secured to the wagon bottom on opposite sides of the rod 23′ and are terminally secured to the rods 22 on opposite sides of the pivot thereof. These springs normally hold the rods 22 with their notches engaged over the brake bars and lock the latter in released position. Upon depression of the rod 23′, the outer ends of the rods 22 are raised so that the notches thereof disengage from the brake bars whereupon the latter may be moved to operative position.

For simultaneously actuating the draw cords 16 and 19 in opposite directions, I provide a grooved pulley 26 having ratchet teeth 27 and 28 on the flanges, the ratchet teeth on one flange having their points extending counter to the points of the ratchet teeth on the mating flange. The pulley is provided internally with a spider 29 having a hub 30 which is revolubly mounted on a shaft 31 secured in suitable bearings 32 arranged on the bottom face of the wagon bottom. The pulley is of sufficient size to extend half below and half above the wagon bottom, and a curved housing 33 is secured to the top face of the wagon bottom and is provided with slots 34 to expose the ratchet teeth of the pulley. A curved housing 35 is secured to the bottom face of the wagon bottom and houses the lower half of the pulley. The extremities of the draw cords 16 and 19 are wrapped about the pulley in opposite directions and are terminally secured to the spider of the pulley. For rotating the pulley forwardly in order to wind the draw cable 16 thereon and set the brakes, I provide a lever 36 which is provided at one end with a bearing 37 to receive the shaft 31, and is provided intermediate its ends with a gravity pawl 38 which is adapted to engage with the rearwardly pointing ratchet teeth of the pulley. Upon rocking the lever forwardly the draw cord 16 will be wound upon the pulley and the brakes set. For releasing the brakes I provide a lever 39 which is equipped with a suitable eye 40 to receive the shaft 31 and is furthermore provided with a gravity pawl 41 which operatively engages the forwardly pointing teeth of the ratchet wheel. Upon a rearward rocking of the lever the pulley will be rotated in such a direction as to wind the draw cord 19 and move the brakes to released position.

From the above description it will be seen that a strong durable brake mechanism is presented which is composed of a few number of parts, these parts being entirely concealed beneath the wagon bottom when in released position.

What is claimed, is:—

1. The combination with a vehicle box, of bowed brake beams pivoted intermediate the ends on the box bottom, longitudinal braces bridging the curved portions of the beams, guide arms secured to the box bottom straddling and slidably supporting said braces, a draw cord operatively connected to the outer ends of said beams, a second draw cord operatively connected to the inner ends of said beams, means for actuating both cords simultaneously in opposite directions for actuating said beams, and spring controlled toggle rods engaging and normally holding said beams rocked to released position longitudinally upon the box bottom.

2. The combination with a vehicle box, of bowed brake beams pivoted intermediate the ends on the box bottom, and adapted to be rocked entirely within the borders of the box bottom, a pair of rods having the inner ends pivotally connected together and having notches formed near the outer ends adapted to engage the inner ends of the brake beams and lock the lever in released position, a stand rod pivotally assembled with said rods, a spring connected to one of the first named rods and serving to hold the rods in operative position, and means for rocking said beams to operative and to released position.

3. The combination with a vehicle box, of brake beams pivoted intermediate the ends on the box bottom, a draw cord connected to the outer end portions of the beams, a second draw cord connected to the inner end portions of the beams, and means for simultaneously moving said cords in opposite directions whereby to actuate said beams including a grooved pulley, the terminals of said cords being secured to and wrapped in opposite directions about the pulley, said pulley having ratchet teeth formed on the flanges, the ratchet teeth on one flange pointing in a counter direction to the ratchet teeth on the mating flange, and a pivoted lever for each series of ratchet teeth, each lever being equipped intermediate the end with a pawl operatively engaging the related series of ratchet teeth.

In testimony whereof, I affix my signature, in presence of two witnesses.

EMILE G. FAVRE.

Witnesses:
  Paul E. Hill,
  Cecile M. Hill.

---

Copies of this patent may be obtained for five cents each, by addressing the "Commissioner of Patents, Washington, D. C."